United States Patent [19]
Okada et al.

[11] Patent Number: 5,678,062
[45] Date of Patent: Oct. 14, 1997

[54] INPUT/OUTPUT CONTROL METHOD AND DATA PROCESSOR

[75] Inventors: Tetsuhiko Okada, Hachiouji; Hideki Murayama, Kunitachi; Takehisa Hayashi; Atsushi Ugajin, both of Sagamihara; Yasuhiro Ishii, Hadano; Masahiro Kitano, Hiratsuka, all of Japan

[73] Assignee: Hitachi, Ltd., Tokyo, Japan

[21] Appl. No.: 199,889

[22] Filed: Feb. 22, 1994

[30] Foreign Application Priority Data

Feb. 22, 1993 [JP] Japan ................... 5-031008

[51] Int. Cl.⁶ ........................................ G06F 13/00
[52] U.S. Cl. ............ 395/842; 395/821; 364/242.3; 364/242.31
[58] Field of Search ................... 364/200, 900, 364/239, 238.3, 242.31, 232.8, 242.3, 260; 395/425, 843, 842, 287, 846, 850, 821, 480

[56] References Cited

U.S. PATENT DOCUMENTS

| | | | |
|---|---|---|---|
| 4,271,466 | 6/1981 | Yamamoto et al. | 345/850 |
| 4,475,155 | 10/1984 | Oishi et al. | 395/842 |
| 4,658,350 | 4/1987 | Eggebrecht et al. | 395/846 |
| 4,729,090 | 3/1988 | Baba | 395/287 |
| 5,062,073 | 10/1991 | Masuda et al. | 395/856 |
| 5,111,425 | 5/1992 | Takeuchi et al. | 395/842 |
| 5,333,290 | 7/1994 | Kato | 395/846 |
| 5,398,324 | 3/1995 | Matida et al. | 395/842 |

OTHER PUBLICATIONS

"HP Precision Architecture: The Input/Output System", Hewlett Packard Journal, pp. 23–30, Aug. 1986.

Hewlett–Packard Journal, Aug. 1986, pp. 23–30.

*Primary Examiner*—Thomas G. Black
*Assistant Examiner*—Greta L. Robinson
*Attorney, Agent, or Firm*—Fay, Sharpe, Beall, Fagan, Minnich & McKee

[57] ABSTRACT

A system for controlling the DMA transfer for a plurality of IO devices has an IO controller for each group of the IO devices. Data is retrieved from memory and stored in the IO controller where it is analyzed. The retrieved data has a structure that permits a group of DMA start request quads to be linked together for parallel or pipeline processing of the DMA transfer requests. Each start request quad has a pointer for additionally retrieving corresponding command data. The command data is set forth in a number of blocks, each linked to the next one by a pointer. When a DMA processing has been completed, the termination or completion status is entered into a specific entry in a completion list for the corresponding IO device. Thus, a determination can be made as to whether specific IO devices have completed a requested DMA processing. Expansion of the system is accomplished by using combinations of main and sub controllers, where one main controller provides the aforementioned data structures for many sub controllers in order to enable the DMA processing to be performed for IO devices connected to the sub controllers with less frequent access of system main memory and the system bus.

23 Claims, 10 Drawing Sheets

INPUT/OUTPUT CONTROL METHOD AND DATA PROCESSOR

FIELD OF THE INVENTION

The present invention relates to an IO control method and a data processor, particularly to an IO control method and system used in a data processor for controlling DMA transfer for a plurality of input/output devices.

BACKGROUND OF THE INVENTION

Figure 8:
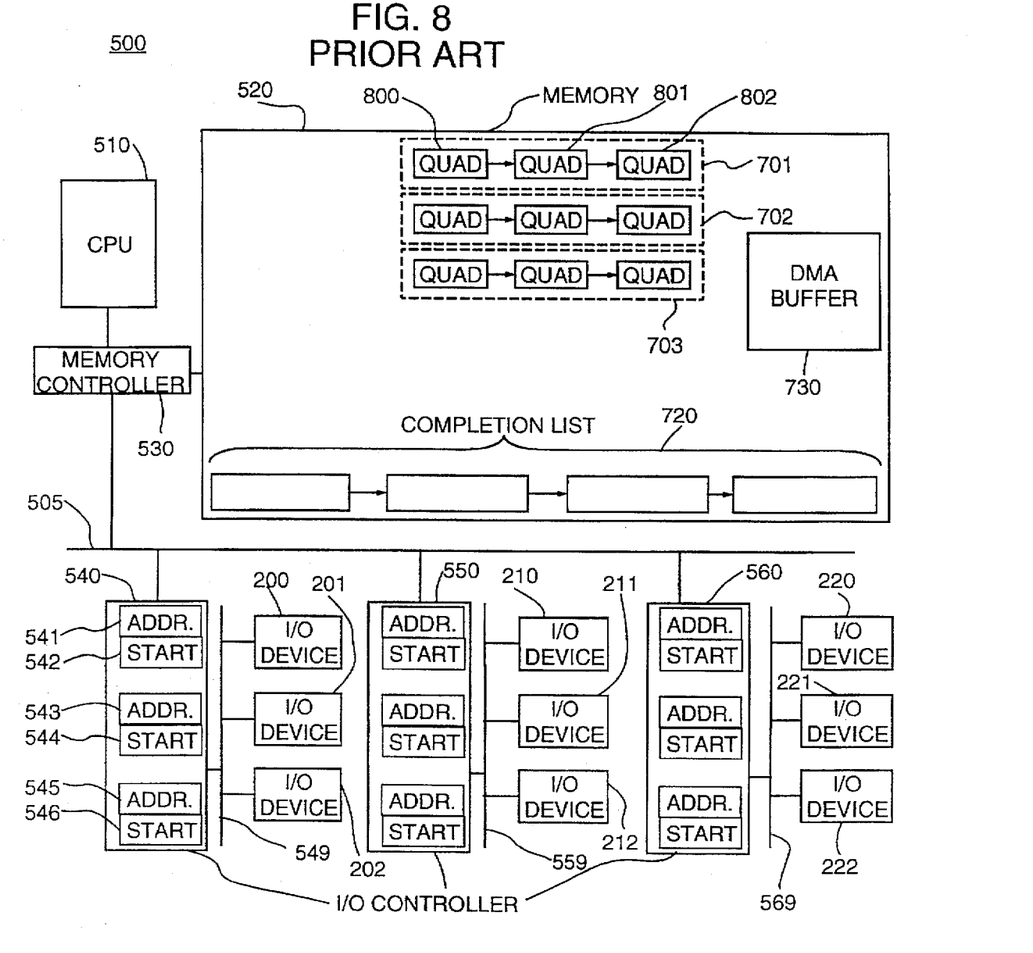
FIG. 8 is a block diagram of an existing data processor.

FIG. 8 shows a data processor that executes IO control having a configuration presumed to represent the prior art. For reference, a known IO system is discussed in the Hewlett-Packard Journal, August 1986, pp. 23–30. This data processor 500 comprises a CPU 510; a memory control section 530 connected to the CPU 510; a main memory 520 connected to the memory control section 530; a system bus 505 connected to the memory control section 530; IO control sections 540, 550, and 560 connected to the system bus 505; an IO bus 549 connected to the IO control section 540; IO elements (input/output devices) 200, 201, and 202 connected to the IO bus 549; an IO bus 559 connected to the IO control section 550; IO elements 210, 211, and 212 connected to the IO control section 550 through IO bus 559; and IO elements 220, 221, and 222 connected to the IO bus 569, which is in turn connected to IO control section 560.

The main memory 520 has DMA command data structures 701, 702, and 703 corresponding to the IO elements 200, 201, and 202 connected to the IO control section 540; a completion list 720 to which the state of each of the IO elements 200, 201, and 202 connected to the IO control section 540 is reported from each of them; and a DMA buffer 730 for holding the data transferred from or to be transferred to the IO elements 200, 201, and 202 according to a data transfer command. The main memory 520 has the same DMA command data structure and completion list for the IO control sections 550 and 560 though they are not illustrated.

The IO control section 540 stores an address register 541 and start register 542, an address register 543 and start register 544, and address register 545 and start register 546 which correspond to IO elements 200, 201, and 202 respectively. The address register 541 holds the address of the DMA command data structure 701 set in the main memory 520. The start register 542 is used to provide the timing for reading the DMA command data structure 701. The address register 543 holds the address of the DMA command data structure 702. The start register 544 is used to provide the timing for reading the DMA command data structure 702. The address register 545 holds the address of the DMA command data structure 703. The start register 546 is used to provide the timing for reading the DMA command data structure 703. The IO control sections 550 and 560 also have address and start registers.

Figure 9:
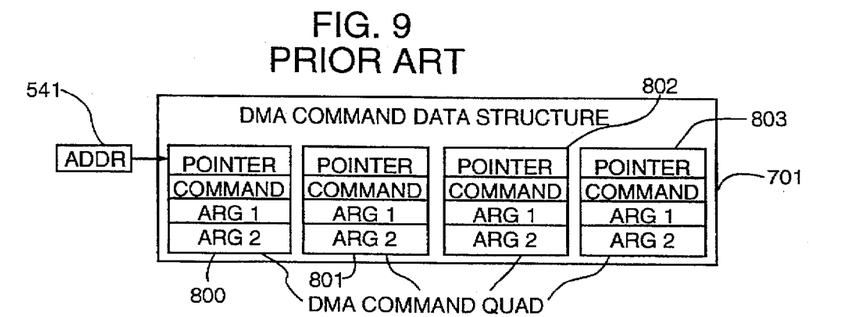
FIG. 9 is an illustration showing a link between the address register of the IO control section and the DMA command data structure of an embodiment according to the prior art.

FIG. 9 shows a link between the address register 541 of the IO control section 540 and the DMA command data structure 701 of the main memory 520. The address register 541 of the IO control section 540 indicates a DMA command quad 800. The DMA command data structure 701 comprises a chain of DMA command quads 800, 801, 802, 803, etc. Each of the DMA command quads has a pointer for the next DMA command quad, DMA command, argument 1, and argument 2. The same arrangement is provided for the DMA command data structures 702 and 703.

Figure 10:
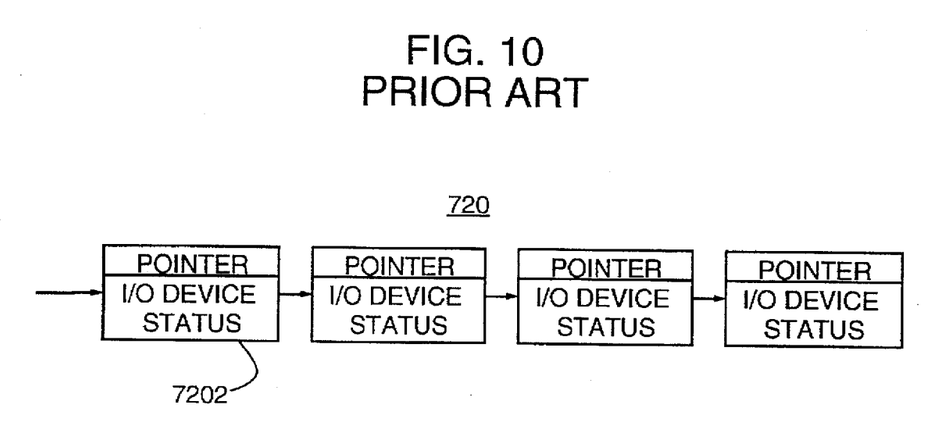
FIG. 10 is an illustration of the completion list of an embodiment according to the prior art.

FIG. 10 shows the arrangement of data for a completion list 720. The completion list 720 has a state entry 7202, which describes the states of the IO elements.

The data processor 500 generates the DMA command quads for the IO elements. For example, the data processor 500 generates a DMA command quad for the IO element 200 and writes it in the main memory 520 as the DMA command data structure 701 when the CPU 510 has a DMA request for the IO element 200. Moreover, the data processor 500 writes pointer data for the DMA command data structures 701–703 in the address registers 541, 543, 545, respectively, of the IO control sections 540.

Each IO control section functions similarly. For example, the IO control section 540, when the IO element 200 is ready for operation, refers to the corresponding address register 541 to read the DMA command quads 800, 801, ... from the DMA command data structure 701 in the main memory 520 one by one and makes the IO element execute the DMA processing in order. When the section 540 terminates the DMA processing for the IO element 200, it inserts a state entry describing the termination state of the DMA processing for the IO element 200 into a chain structure list comprising completion list 720 in the main memory 520.

SUMMARY OF THE INVENTION

For the above prior art, an address register and start register are set for each IO element. Therefore, to connect a plurality of IO elements to one IO control section, it is necessary to set an address register and a start register for each of the IO elements. However, this causes the following problems.

First, when a plurality of registers are set, the hardware cost increases. Second, because an address space for mapping a plurality of resisters is necessary, the number of IO elements to be connected to the IO control section depends on the size of the address space for the IO control section, which is limited. Third, when an IO control section accesses a register through a system bus, it is difficult to secure the bus right of the system bus and perform protocol processing at high speed. Moreover, frequent access of the registers tends to decrease the throughput (amount of data to be transferred in unit time) of the system bus compared with general data transfer. Therefore, when a plurality of registers are set in the IO control section and the frequency of access to the registers from a CPU increases, the system performance is degraded.

Still further, the above prior art data processor has a problem with providing a highly efficient performance of the IO elements because the DMA processing can be executed only one by one even if one IO element can execute a plurality of DMA processings in parallel since the DMA command quads are sequentially read to make the IO element process the quads one by one.

Moreover, the prior art data processor does not analyze the termination state of the DMA processing for any particular IO element at once among the termination states of many IO elements that are entered into a completion list.

Accordingly, it is a first object of the present invention to provide an IO control method and a data processor capable of controlling IO elements without requiring the setting of an address register and a start register for each IO element.

It is a second object of the present invention to provide an IO control method and a data processor for permitting an IO element to execute DMA processings in parallel.

Furthermore, it is the third object of the present invention to provide an IO control method and a data processor that enables the termination state of the DMA processing for any particular IO element to be determined from and entered into a completion list quickly when the termination states of many IO elements are present or being entered into the completion list.

According to one aspect of the present invention, an IO control method is provided that uses a data processor comprising a CPU, a memory connected to the CPU, an IO control section connected to the memory, and a plurality of input/output devices, wherein the CPU writes a plurality of IO command data values to be sent to the input/output devices in the memory as command data structure corresponding to the devices, IO identification data for identifying input/output devices and command pointer data for IO command data corresponding to the IO identification data in the memory as a request data structure, and request pointer data for the request data structure in an address register of the IO control section. The IO control section reads the written IO identification data and command pointer data from the memory by referring to the address register and the written IO command data from the memory by referring to the command pointer data, and thereby makes an input/output device ready for operation and execution of the processing of an IO command corresponding to the device.

Moreover, the present invention provides a data processor comprising a CPU, a memory connected to the CPU, an IO control section connected to the memory, and a plurality of input/output devices, wherein the memory has a command data structure corresponding to the input/output devices in which a plurality of IO command data values to be sent to the input/output devices are written by the CPU and a request data structure in which IO identification data for identifying input/output devices and command pointer data for IO command data corresponding to the IO identification data are written. Also, the IO control section has an address register in which the request pointer data for the request data structure is written by the CPU, an analysis section, a local memory, and an IO processing section. The analysis section reads the IO identification data and command pointer data from the request data structure by referring to the address register to write them in the local memory and the IO processing section reads the IO command data from the command data structure by referring to the IO identification data and command pointer data written in the local memory and makes an input/output device ready for the operation of executing the processing of an IO command corresponding to the device.

According to another aspect of the invention, an IO control method in which an IO control section makes an input/output device ready for operation executes the processing of an IO command corresponding to the device and thereafter reads the next IO command data corresponding to an input/output device ready for operation even before termination of the processing to make the device execute the processing of the IO command. Moreover, the present invention provides a data processor in which the analysis section reads a plurality of IO identification data values and a plurality of command pointer data values and writes them in a local memory if possible. The IO processing section makes an input/output device ready for the operation to execute the processing of an IO command corresponding to the device and thereafter reads the IO command data from the command data structure by referring to command pointer data corresponding to the next input/output device ready for operation even before termination of the processing to make the device execute the processing of the IO command corresponding to the device.

In yet another aspect of the present invention, an IO control method is provided that uses a data processor comprising a CPU, a memory connected to the CPU, an IO control section connected to the memory, and a plurality of input/output devices connected to the IO control section, wherein the IO control section writes IO identification data for identifying an input/output device and state data for showing that the processing has terminated for the input/output device in the memory. The CPU reads the written IO identification data and state data from the memory, and thereby determines when the input/output device reaches the termination state. Moreover, the present invention provides a data processor comprising a CPU, a memory connected to the CPU, an IO control section connected to the memory, and a plurality of input/output devices connected to the IO control section; wherein the memory has a data structure in which IO identification data for identifying an input/output devices to be controlled and state data for showing the state of processing the input/output device are written by the IO control section.

For the IO control method and data processor of the present invention according to the first mentioned aspect, only an address register and start register are set in the IO control section independently of the number of input/output devices connected to the IO control section. Moreover, a pointer for the command data structure corresponding to the input/output devices is written in a memory as a request data structure and the address of the request data structure is written in the address register of the IO control section. Then, the IO control section executes IO processing for each input/output device by referring to the request data structure and command data structure in the memory.

Therefore, because an address register and start register are set in the IO control section, no additional hardware cost is required. Moreover, because only an address space for two registers is necessary, the number of input/output devices to be connected is not limited by the size of the address space of the IO control section. Moreover, it is possible to minimize the number of times the registers of the IO control section are accessed to thus prevent the throughput from decreasing.

For the IO control method and data processor of the present invention according to the second mentioned aspect, the IO control section makes an input/output device execute the processing of an IO command and thereafter reads the next IO command data corresponding to an input/output device ready for operation even before termination of the processing from the memory to make the device execute the processing of the IO command. Therefore, it is possible to make an input/output device execute DMA processings in parallel and fully derive the performance of the input/output device.

For the IO control method and data processor of the present invention according to the third mentioned aspect, the memory has a data structure in which IO identification data for identifying an input/output device to be controlled and state data for showing the state of the completion of the processing for the input/output device are written into a section of memory by the IO control section.

Therefore, even if a lot of input/output devices are connected to the data processor, it is possible to quickly determine when a particular input/output device has completed DMA processing.

DETAILED DESCRIPTION OF THE PREFERRED EMBODIMENTS

The present invention is described below in detail according to the embodiments shown in the drawings. However, the present invention is not restricted to the embodiments.

Figure 1:
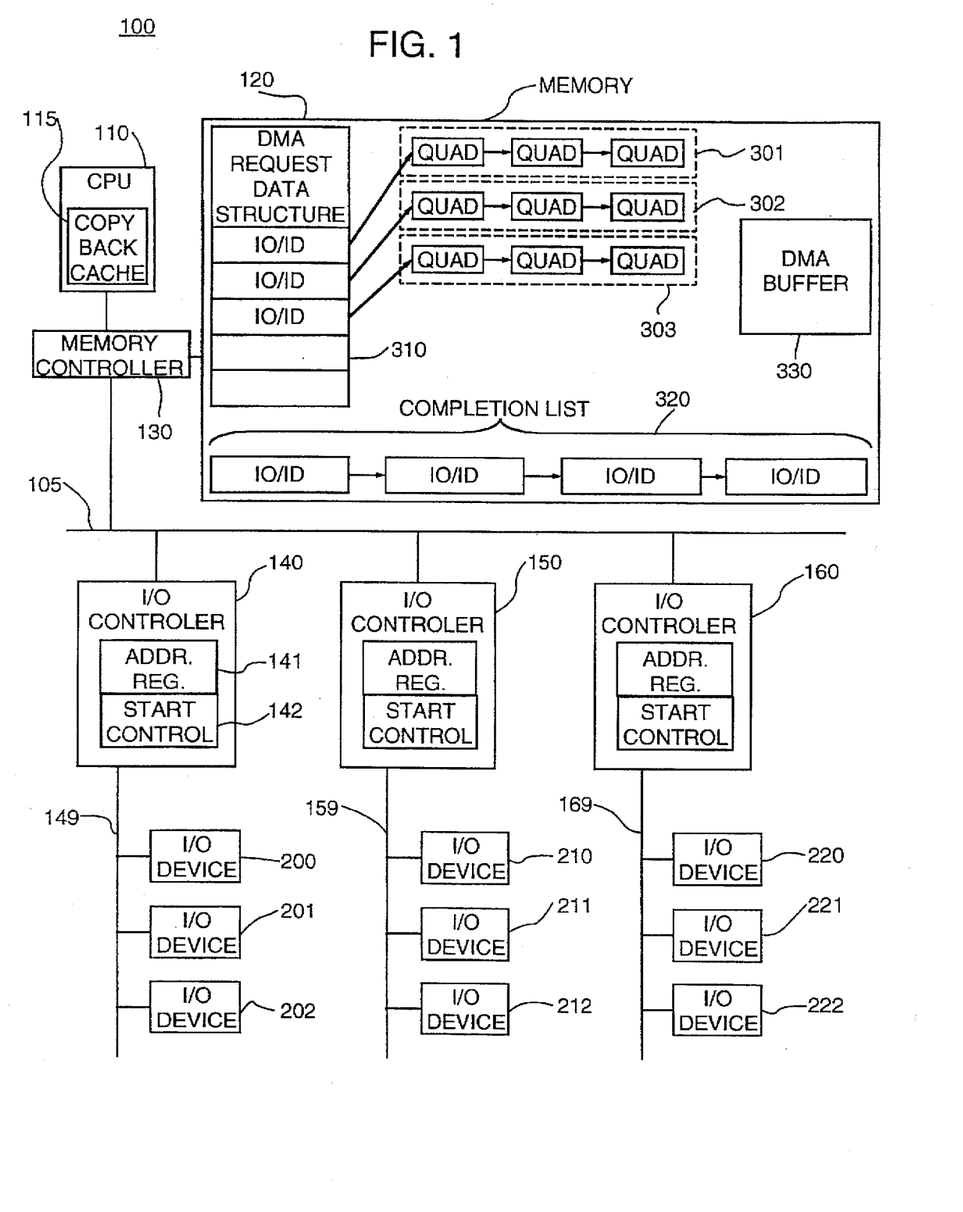
FIG. 1 is a block diagram of an embodiment of the IO control system of the invention used in a data processor.

FIG. 1 shows an embodiment of the data processor of the present invention. The data processor 100 has a CPU 110, which preferably includes a copy back cache 115. A memory controller 130 connected to CPU 110 controls access to a main memory 120. Memory controller 130 is also connected via a system bus 105 to IO control sections 140, 150 and 160. Of course, additional controllers can be connected to the system bus 105. The IO controllers 140, 150 and 160 have control over respective IO elements or devices through respective IO buses. For example, IO controller 140 has an IO bus 149 to which IO devices 200, 201 and 202 are connected. Similarly, IO controllers 150 and 160 have respective IO buses 159 and 169 with IO devices 210, 211 and 212 connected to IO bus 159 and IO devices 220, 221 and 222 connected to IO bus 169.

A DMA request data structure is stored for each of the IO controllers. The details of the data structure or arrangement of storing the DMA request data is made with reference to IO controller 140. Main memory 120 stores DMA request data structure 310 for IO controller 140. Specifically, the DMA request data structure 310 has DMA command data structures 301, 302 and 303 for one or more of the IO devices 200, 201 and 202. The main memory also includes a DMA buffer 330 for holding data transferred from or to be transferred to the IO devices 200, 201 and 202 in accordance with a data transfer command. Also includes within main memory 120 is a completion list 320 that holds identification data for each IO device to enable the DMA processing status of the device to be determined. A completion list 320 is provided for each of the IO controllers 140, 150 and 160, although only one completion list 320 is shown for IO controller 140.

Preferably, the DMA request data structure and DMA command data structures are stored as blocks of data in main memory 120 of a block size equal to or an integral multiple as large as the block size of the data read operation performed by the cache memory 115 when a cache miss occurs. Also, the size of data blocks to be transferred over system bus 105 is preferably an integral multiple of the block size of the cache memory 115 in order to permit efficient transfer of data between main memory 120 and the IO control sections 140, 150 and 160. As a further consideration, in some instances, the information of the DMA processing may be of a sufficient size so as to fit within or be solely represented by the data block for the DMA start request quad. For example, all of the data required to complete a particular DMA processing could be provided as part of the argument 311d of quad 311 in FIG. 2. In this case, providing corresponding DMA command data for the start request quad would be unnecessary and the efficiency of the DMA processing would be improved as a result.

Each of the IO control sections has an address register and a start register. For example, the IO control section 140 has an address register 141 and a start register 142. The address register 141 can hold the address of the DMA request data structure 310 set in the main memory 120. This address can then be used by the IO control section once the DMA processing is commenced. The start register 142 is used to start the DMA processing of the IO control section 140. Such registers are usually provided for a conventional IO controller, but start register 142 may be unnecessary if the IO control section is awakened or selected by the CPU in another manner, for example when the address for the DMA request data structure is written to the address register 141 by the CPU, or when, according to one preferred embodiment, the CPU writes a DMA request data structure to the IO control section 140. Preferably, each of the IO control sections is configured similarly, and therefore further description of IO controllers 150 and 160 is unnecessary.

Figure 2:
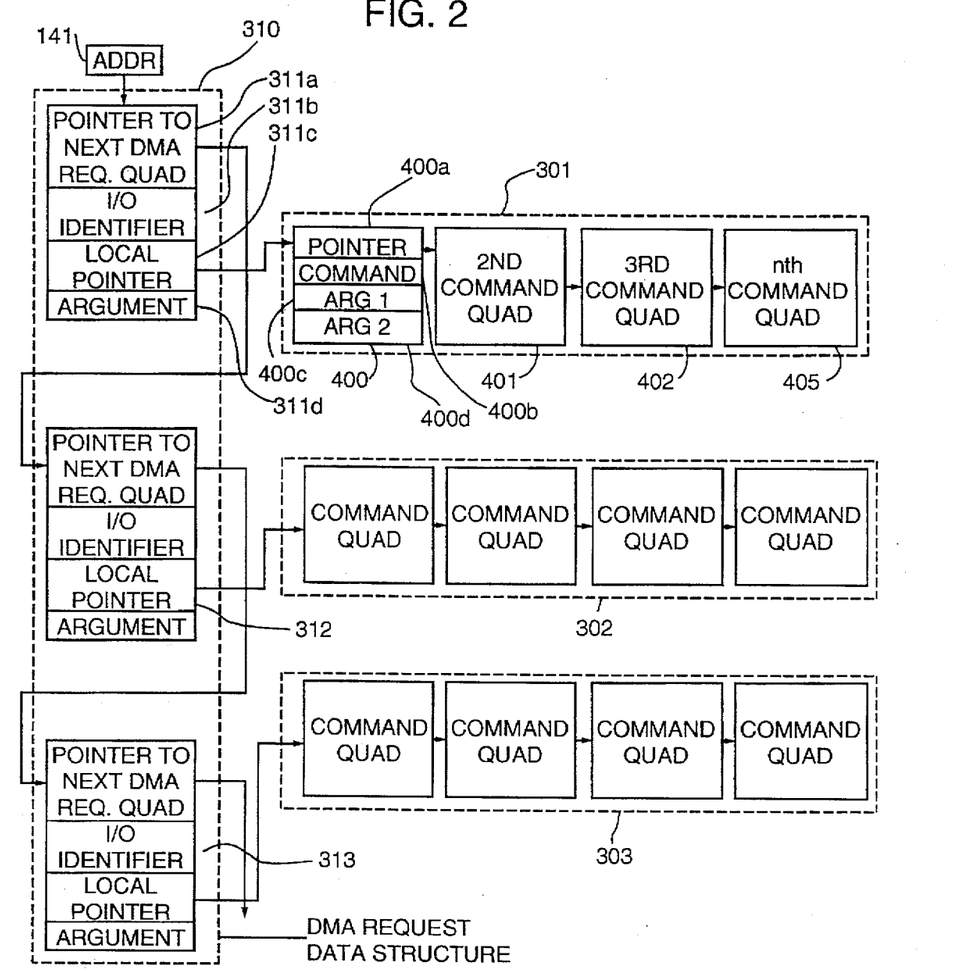
FIG. 2 is an illustration showing a link between the address register of the IO control section on one hand and the DMA request data structure and DMA command data structure of the present invention.

FIG. 2 shows a link between the address register 141 of the IO control section 140 on the one hand and the DMA request data structure 310 and the DMA command data structures 301, 302, and 303 of the main memory 120 on the other. The address stored in the address register 141 of the IO control section 140 designates a DMA start request quad 311 at the head of the DMA request data structure 310 of the main memory 120. Information concerning the start of a DMA processing for a particular IO device is stored in the respective DMA start request quads.

Each IO control section is referred to a chain of DMA start request quads by the start address 141. As shown in FIG. 2, the DMA start request data structure 310 for IO control section 140 is exemplary and has a chain of the DMA start request quads 311, 312, 313, ... corresponding to DMA start requests. Each DMA start request quad comprises a pointer 311a for the next DMA start request quad, IO identification data 311b for identifying an IO element for the DMA start request concerned, a local pointer 311c for designating the corresponding DMA command data structure 301 (specifically the first block command quad 400), if one is present, and an argument 311d. The argument can be of any length, up to several bytes, if desired, and it may include all of the information necessary for the DMA processing, in which case there would not be any corresponding command data structure.

When a DMA start request quad, e.g. 311, is prepared for each IO element and each DMA start request quad is stored in a continuous memory area, the DMA request data structure does not always need to be a linked chain of DMA start request quads as shown in FIG. 2. Rather, the IO control section can be instructed to read a plurality of the DMA start request quads one by one in sequential order, for example.

Each of the command data structures 301, 302 and 303 that are identified by the local pointers of the corresponding DMA start request quads 311, 312 and 313 have a chain of DMA command quads or blocks. FIG. 2 shows the DMA command data structure 301 in detail, and DMA command data structures 302 and 303 are similar. Although the quad structure is disclosed as being preferred, alternative data structures other than quad structures can be used.

The DMA command data structure 301 has a chain of DMA command quads, such as a first command quad 400, a second command quad 401, a third command quad 402 and an nth command quad 405. The details of the command quads are the same, and are exemplified in FIG. 2 by command quad 400. Command quad 400 has a pointer 400a for providing an address of the next DMA command quad in the chain, a DMA command 400b and first and second arguments 400c and 400d, respectively. The structure of the command quads 401, 402, etc. are the same, so further detail of these quads is omitted from the drawing.

Figure 3:
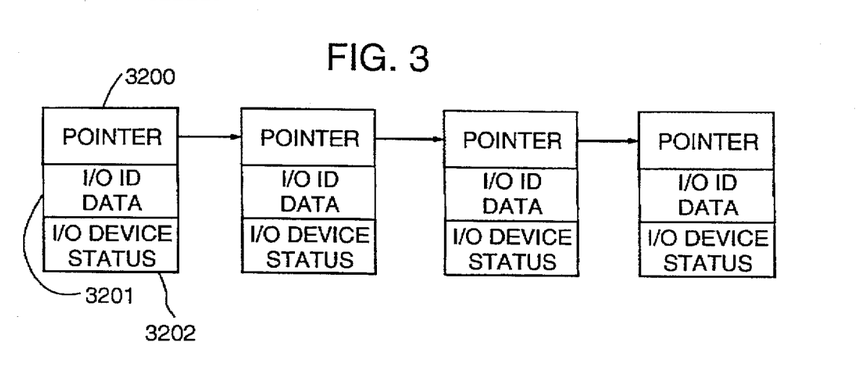
FIG. 3 is an illustration of the completion list of the present invention.

In FIG. 3, the data structure or arrangement of the data stored for each entry in completion list 320 is disclosed. Specifically, each entry has a pointer 3200 for holding an address for the next entry of the completion list, an IO identification data holding entry portion 3201 and a state or status of DMA processing entry portion 3202. Since each entry includes IO identification data 3201, a status inquiry for a specified IO element can be performed to determine the status of the processing of a DMA transfer operation from the corresponding state entry data 3202.

Figure 4:
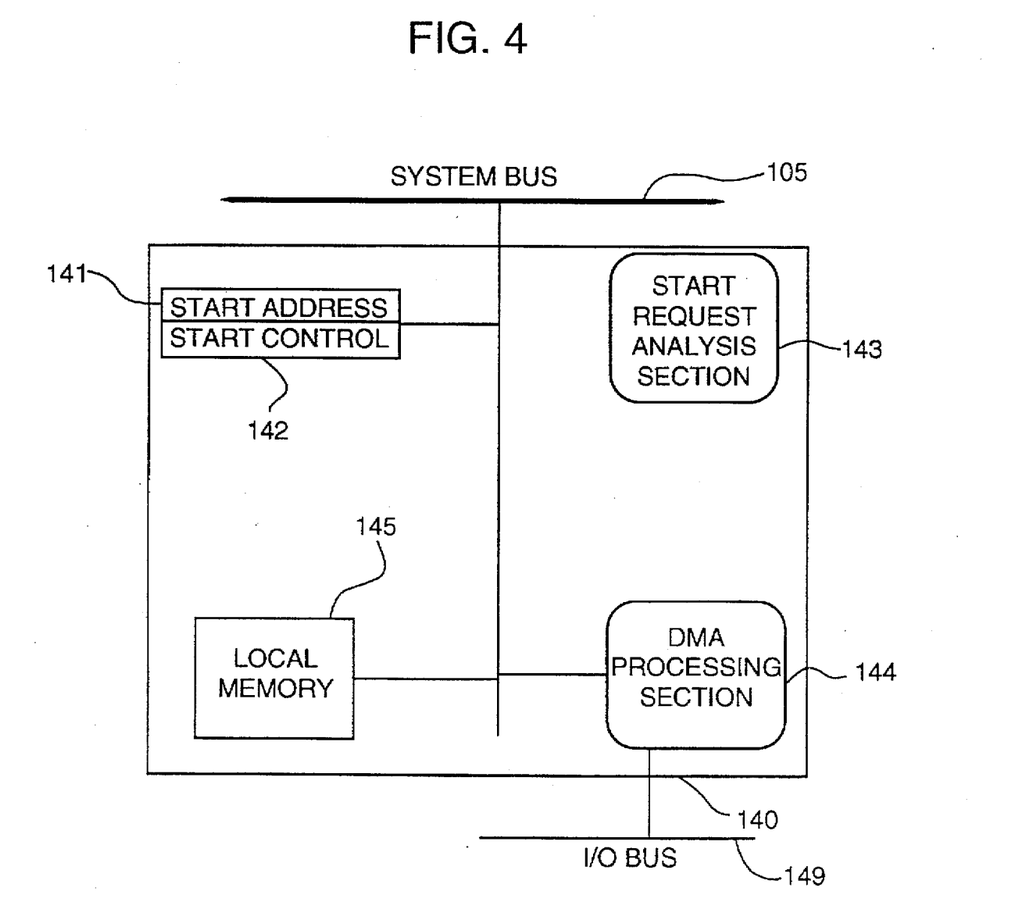
FIG. 4 is a block diagram of the IO control section of the present invention.

Each of the IO controllers or control sections preferably has a design like that of IO controller 140, shown in detail in FIG. 4. IO control section 140 has a start request analysis section 143 that analyzes the DMA request data structure 310 which is retrieved from main memory by the address 141 subsequent to the initiation of DMA processing, which begins with the CPU writing to the start control register 142. The IO controller 140 further includes a DMA processing section 144 for executing DMA control for all IO elements, and a local memory 145 that can be used to store DMA start requests and DMA command data retrieved from main memory 120, as needed.

Figure 5:
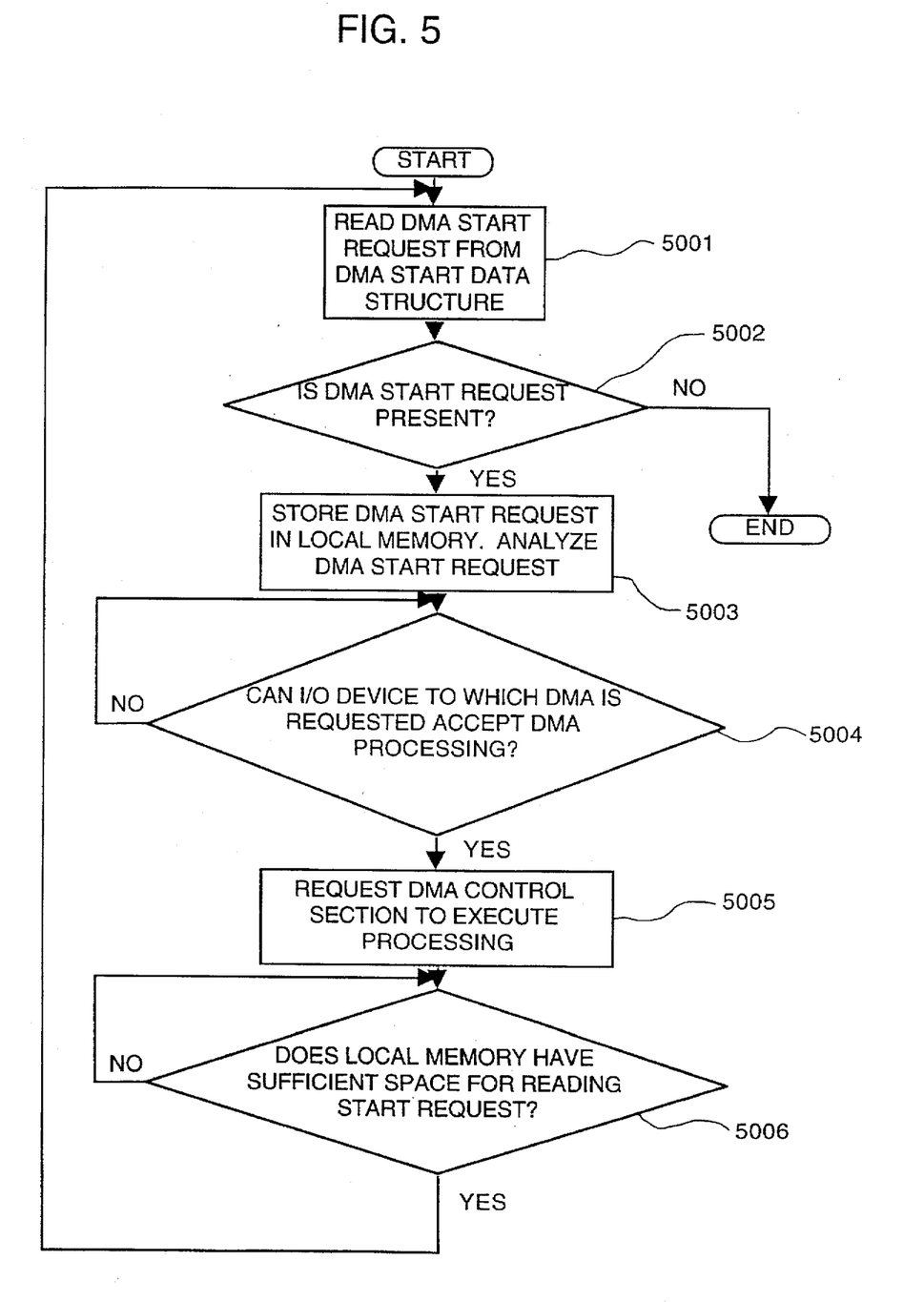
FIG. 5 is a processing flow chart of a start request analysis section.

FIG. 5 shows a flow chart of a start request analysis performed by the IO controllers. The description refers to the start request analysis section 143 of IO controller 140, and the description applies equally to the other IO controllers 150 and 160.

First, start request analysis section 143 reads a DMA start request quad from the DMA request data structure 310 of the main memory 120 by fetching the data on the basis of the addresses written in the address register 141 (step 5001). Unless the section 143 detects a DMA start request quad 311, 312, 313, etc., it terminates the processing (step 5002). When the section 143 detects a DMA start request quad, it stores the quad in the local memory 145 and analyzes the quad (step 5003). Then, the section 143 judges if the IO element designated by the DMA start request quad can accept DMA processing (step 5004). If so, the section 143 requests the DMA processing section 144 to execute the DMA processing (step 5005). In this case, the section 143, for example, sends address data for reading a DMA command data structure to the DMA processing section 144. Thereafter, the section 143 judges if the local memory 145 has sufficient space to store the DMA start request quad (step 5006). If so, the section 143 restarts the step 5001 and reads the next DMA start request quad from the DMA request data structure. Then, the following step 5002 is executed and so forth. Thereby, efficient DMA performance of the IO devices can be fully attained.

Figure 6:
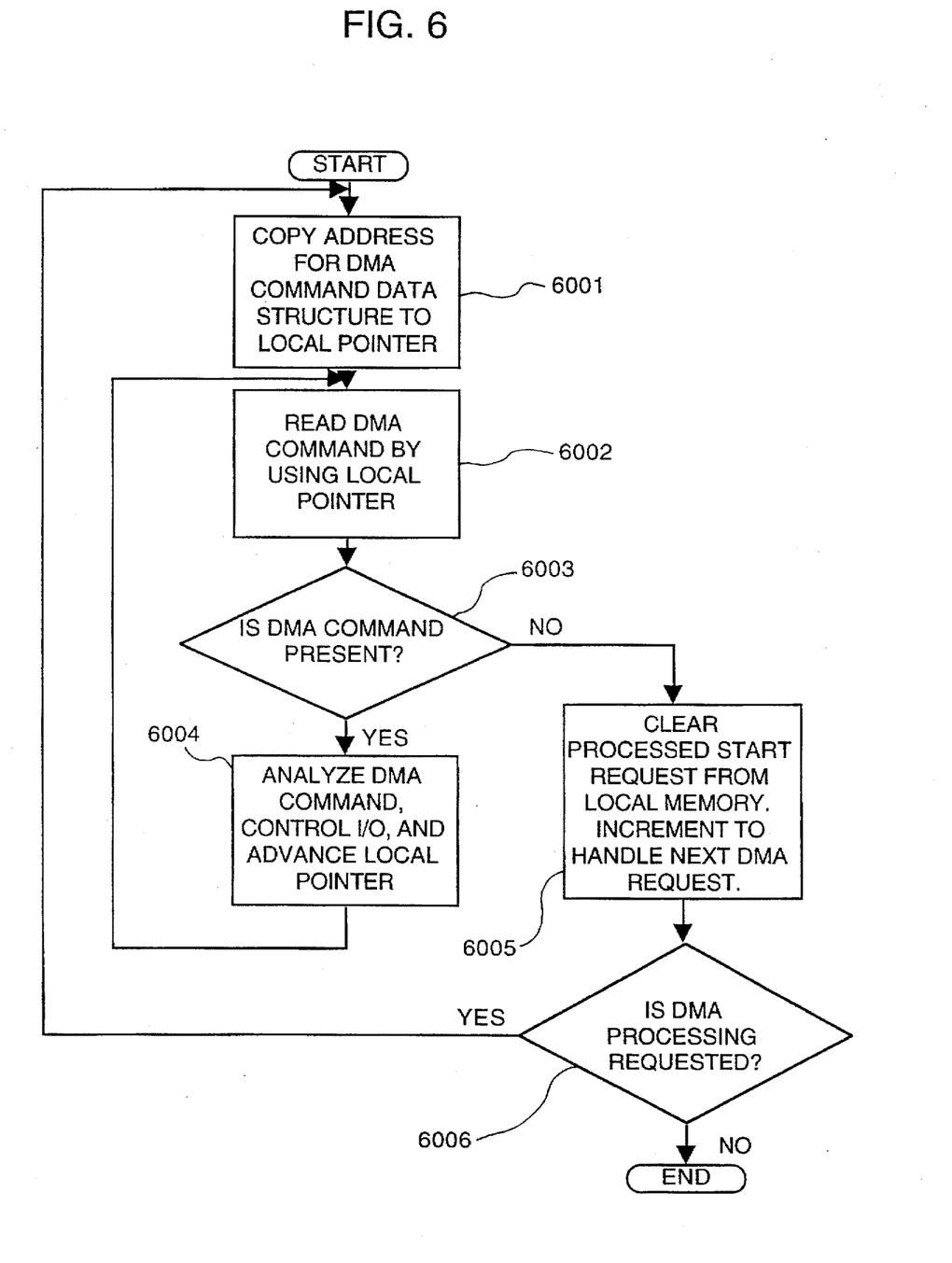
FIG. 6 is a processing flow chart of a DMA processing section.

FIG. 6 is a flow chart of DMA processing by the DMA processing section of the IO controllers, specifically for the IO controller 140. The DMA processing sections for each of the controllers is the same as that for the DMA processing section 144 shown in the figure.

The DMA processing section 144 copies the address data received from the start request analysis section 143 to a local pointer 311c (step 6001). Then the section 144 reads a DMA command quad 400 of the DMA command data structure 301 designated by the local pointer 311c (step 6002) and judges if there is a DMA command present. If so, the section 144 starts the step 6004. If not, the section 144 starts the step 6005. In the step 6004, the section 144 analyzes a DMA command designated by a DMA command quad 400 for example, executes DMA processing for a designated IO element device 200 for example, and then increments the pointer 311a to designate the next DMA start request quad 312, and restarts the step 6002.

In the step 6005, which is executed when no DMA command is found to be present, the section 144 clears the processed DMA start request quad from the local memory 145 and increases the allowable number of DMA processings by one, i.e. the number of DMA processings that can be handled by the section 144. Then, the section 144 judges if there is a request for DMA processing. If so, the section 144 restarts the step 001. If not, the section 144 terminates the processing (step 6006).

Figure 7:
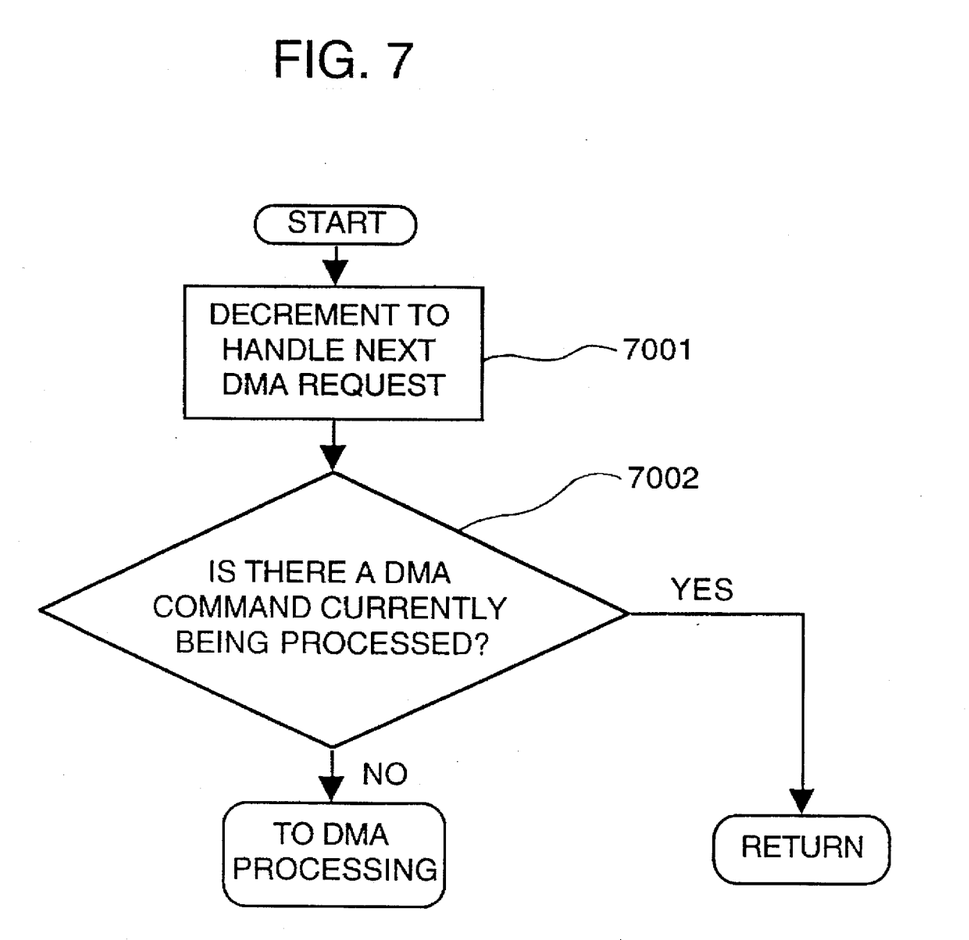
FIG. 7 is another processing flow chart of the DMA processing section.

FIG. 7 is a flow chart of the steps followed when the DMA processing section 144 accepts DMA processing. When the DMA processing section 144 accepts one DMA processing, it decreases the acceptable number of DMA processings by one (step 7001). Then, the section 144 judges if there is a DMA command currently processed. If so, the section 144 restarts the processing. If not, the section 144 starts the DMA processing in FIG. 6 in order to execute the DMA processing just accepted (step 7002).

As an example of DMA processing that can be accomplished according to a preferred embodiment of the present invention, the following is a description of executing a DMA transfer from IO element 200 to the buffer 330. First, the CPU 110 generates a DMA command quad for designating data transfer to the DMA buffer 330 in the DMA command structure arranged or set in the main memory 120. The DMA request quad, having the pointer for the DMA command quad and the IO identifier indicating the IO element 400, is stored in the DMA request data structure of the main memory 120.

Then, after the IO control section 140 terminates all DMA processing, the CPU 110 dynamically provides the DMA start request quad to start the IO control section 140, which recognizes the quad as a request for executing a DMA transfer for the IO element 200 on the basis of the IO identification data written in the DMA start request quad. Moreover, the IO control section 140 reads the DMA command quad(s) designated by the pointer written in the DMA start request quad and recognizes the processing for data transfer to the DMA buffer 330 from the DMA command written in the DMA command quad. Then, DMA transfer is started from the IO element 200 to the DMA buffer 330.

The IO control method and data processor of the present invention do not require any additional hardware cost because an address register and start register are usually provided for an IO control section. Moreover, because only an address space for two registers is necessary, the number of input/output devices to be connected is not limited by the size of the address space of the IO control section. Furthermore as a result of the invention, it is possible to minimize the number of times a CPU accesses the IO control section. This prevents the system throughput from decreasing.

Furthermore, the IO control method and data processor of the present invention allow an input/output device to execute DMA processings in parallel.

In particular, the system configuration permits a plurality of DMA requests to be handled simultaneously for one IO device and alternatively simultaneously for a plurality of IO devices by the same IO controller. To accomplish this, for example, the DMA request data structure for an IO controller can have more than one DMA start request quad for one IO device. Then, while the DMA processing is executed according to one start request, the next start request is prepared by reading the next start request quad referred to by the pointer. The next DMA processing may be executed by multiplexing the data transfer of the requests, if necessary. For example, the IO controller can have a buffer memory for storing the IO blocks of memory to be transferred, and when the transfer is complete between the IO devices and the controller, these blocks can then be transferred to memory by the IO controller over the bus. This is possible because the rate of data transfer over the system bus is performed at a much higher rate than that of the bus connecting the IO controllers, which is higher than that for the IO devices. As a result, a highly efficient operation of DMA transfer among a plurality of IO devices and main memory of a data processor or similar system is provided by the present invention.

Figure 11:
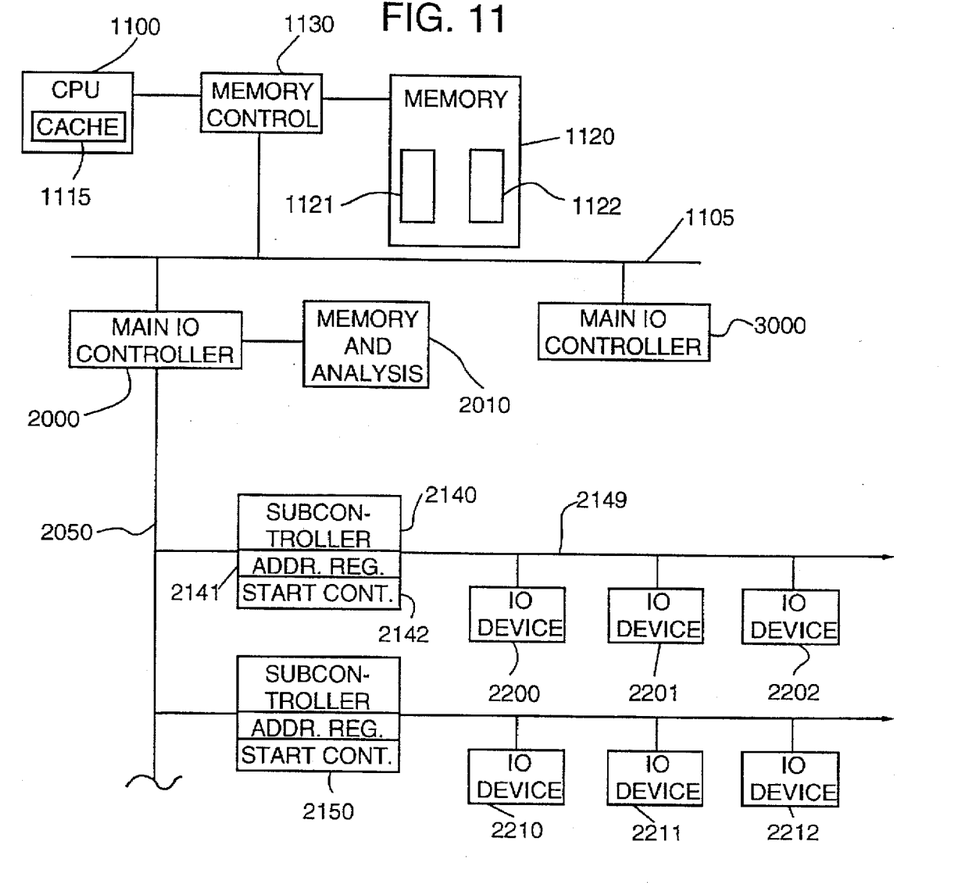
FIG. 11 is a block diagram of another embodiment of an IO control system for a data processor according to the present invention.

In a further embodiment of the invention, shown in FIG. 11, a plurality of IO elements or devices are connected to a sub controller that is in turn connected to a main IO controller. In this embodiment, several sub controllers can be connected to one of many main IO controllers to increase the IO devices that can be supported by the system without degrading the DMA processing performance.

Specifically, the data processing system of the embodiment set forth in FIG. 11 has a CPU 1100 with a copy back cache memory 1115 connected to a memory controller 1130 that is in turn connected to a memory 1120, in an arrangement similar to that shown in FIG. 1 for the corresponding components. The memory controller 1130 is connected via system bus 1105 to a plurality of main controllers 2000, 3000, etc. Each of the main controllers has a plurality of sub controllers connected thereto by a bus. Since it is contemplated that each main controller performs essentially the same function with respect to processing DMA, the remainder of the description of this embodiment refers only to the details of two sub controllers 2140 and 2150 connected to one main controller 2000. A system constructed according to this embodiment may include the connection of additional main controllers to system bus 1105 with corresponding sub controllers connected to each main controller, as desired.

The sub controllers 2140, 2150 are similar to the IO controllers of the first embodiment and sub controller 2140 is connected via bus 2149 to IO devices or elements 2200, 2201 and 2202, whereas IO devices 2210, 2211 and 2212 are connected to sub controller 2150 via bus 2159. Of course, additional IO devices or elements could be connected via the respective buses to the corresponding sub controllers.

In operation, the CPU 1100 writes to main controller 2000 to initiate a data fetch from memory 1120. The retrieved data is stored in local memory and analysis section 2010. Since main controller 2000 provides the DMA request data structures for each of the IO devices connected to each sub controller, the data 1121, 1122, etc. retrieved from memory 1120 includes the DMA request data for each IO device arranged in a data structure divided by sub controller. The section 2010 analyzes the retrieved data to extract a start control address that is written to the start control register 2142, and to extract a start address that is written to the start address register 2141. Then, the DMA processing proceeds with the sub controller accessing the memory and analysis section 2010 instead of main memory, as in the previous embodiment.

Figure 12:
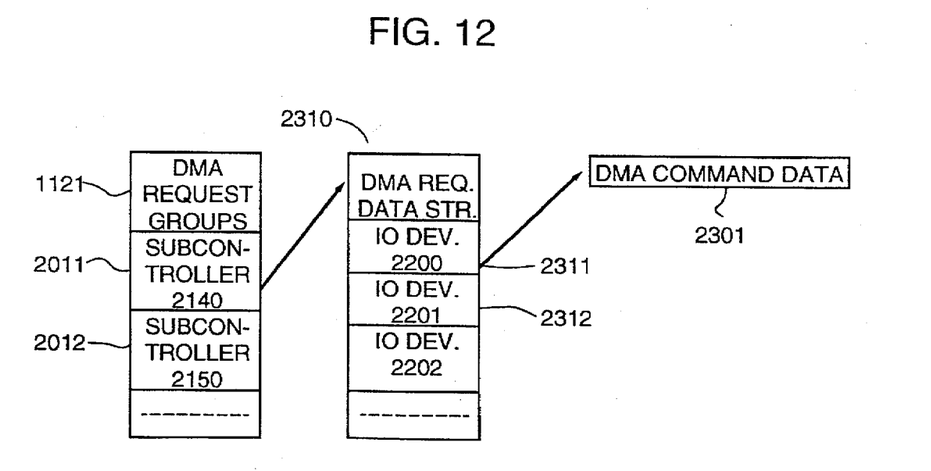
FIG. 12 is a diagram of data structures stored in the memories of the data processor shown in FIG. 11.

Specifically, FIG. 12 shows the arrangement of data structure 1121, for example, retrieved from memory 1120 and stored in local memory and analysis section 2010. The data structure includes the DMA request data structure 2011, 2012, etc. for the corresponding sub controllers 2140, 2150 and so forth. For each sub controller, there is a DMA request data structure for each IO element, arranged in a manner similar to that of the DMA request data structure 310, wherein each IO device start request quad and corresponding DMA command data is structured or arranged like that shown in FIG. 2. In particular, the data structure 2011 stored in local memory and analysis section 2010 includes a DMA request data structure 2310 having DMA start request quads 2311 and 2312, etc. for IO elements 2200 and 2201, respectively. As shown further, DMA start request quad 2311 includes a local pointer for addressing corresponding DMA command data 2301 in a manner similar to that described with respect to the first embodiment of the invention.

As a result of the configuration shown in FIG. 11, the main controllers can efficiently access main memory 1120 for DMA processing without requiring an inefficient accumulation of system access times that might be required if a large number of individual sub controllers were designed to individually access main memory 1120 directly through the system bus 1105. In other words, the configuration permits the use of main controllers that access the system bus and slower speed sub controllers and corresponding buses that have a slower transfer rate without degrading the overall efficiency of the system. Further, since the IO devices have a relatively low transfer rate, as compared with the buses and controllers, multiplexed DMA processing can be performed to permit parallel DMA processing for several IO elements simultaneously for each sub controller.

Figure 13:
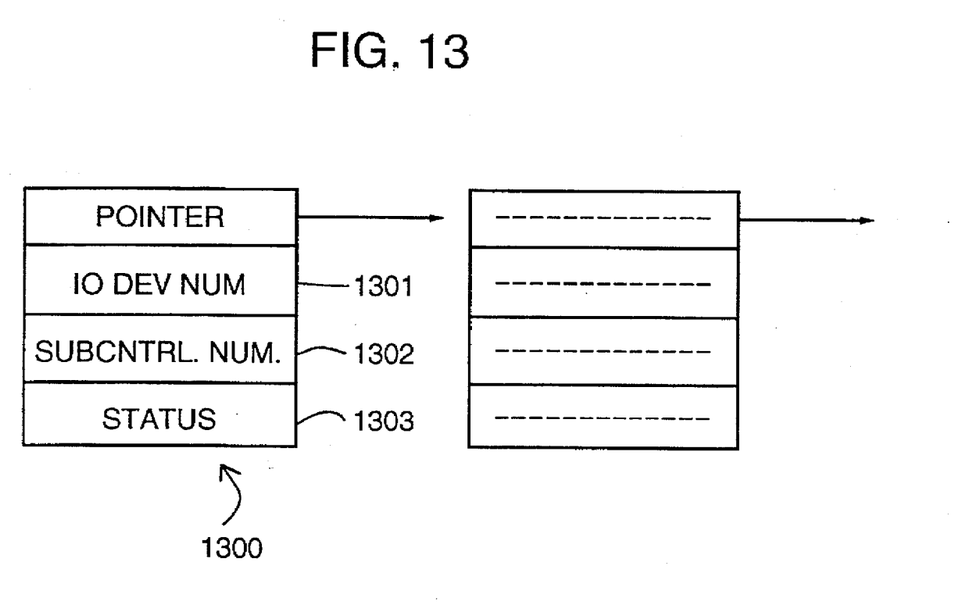
FIG. 13 is a diagram of another embodiment of a completion list used in the system of FIG. 11.

FIG. 13 shows a completion list that is suitable for use with the data processing system of FIG. 11 in that each element 1300 of the completion list includes a device number 1301 and a sub controller number 1302 in order to uniquely identify each IO element or device of the system shown in FIG. 11. For each IO device, a status or termination state entry 1303 reflecting the status of the termination of DMA processing is included. Accordingly, the status of DMA processing for each IO element or device of the overall system can be determined from the completion list shown in FIG. 13. Of course, each of the IO devices would have a completion list entry 1300, but only one such entry is shown in detail.

In each of the IO control method and data processor embodiments of the present invention, it is possible to quickly find an input/output device that has terminated DMA processing even if a large number IO devices are connected to the system and undergoing DMA transfer operations. This is because the completion list has a data structure in which IO identification data for identifying an input/output device to be controlled and state data for showing the state of the input/output device are written by an IO control section.

Further, if desired, a ½ completed status or any fraction thereof can be included within the command data quad to instruct the IO controller or sub controller to write to the completion list with the specified status update, such as ½ completed. This may be beneficial for some systems in the efficient management of the DMA processing for IO devices.

While preferred embodiments have been set forth with specific details, further embodiments, modifications and variations are contemplated according to the broader aspects of the present invention, all as determined by the spirit and scope of the following claims.

I claim:

1. A method for controlling DMA processing for a plurality of IO devices connected to a data processing system having memory, a CPU, at least one IO controller and a bus for connecting said IO controllers to said CPU and memory, comprising the steps of:

storing a plurality of DMA request quads for each of said IO devices into a DMA request data structure in said memory, and storing IO command data into a plurality of DMA command data structures in said memory, said DMA request data structure being stored at a start address in said memory, wherein said DMA command data structures respectively correspond to said IO devices and to said DMA request quads;

writing the start address for one said DMA request data structure to said IO controller and storing said start address in said IO controller;

executing a DMA processing in response to said IO controller receiving a DMA start request, including reading from memory one of said DMA request quads for one IO device of said plurality of IO devices and executing the DMA processing with said one IO device in accordance with IO command data in one of said DMA command data structures, said one DMA command data structure corresponding to said one DMA request quad.

2. The method according to claim 1, further including said IO controller controlling DMA processing for a set of said IO devices and said storing including storing respective ones of said DMA request quads for IO devices in said set of said IO devices.

3. The method of claim 2, wherein said storing stores each said DMA request quad that includes a pointer for pointing to a next DMA request quad, an IO device identifier identifying the corresponding IO device, a local pointer for pointing to respective IO command data and an argument for the DMA processing.

4. The method according to claim 1, further including storing, for each said DMA request quad, a pointer to a next DMA request quad within said DMA request data structure, an IO device identifier for identifying the corresponding IO device, a local pointer for pointing to respective IO command data for said corresponding IO devices by said IO identifier and one argument setting forth parameters for the DMA processing, wherein said IO controller analyzes the received start request and initiates the processing by retrieving the local pointer from the corresponding DMA request quad and storing in a local memory of the IO controller and executing the command data stored in main memory and addressed by said local pointer.

5. A method for controlling DMA processing for a plurality of IO devices connected to a data processing system having memory, a CPU, a plurality of IO controllers, each controlling one set of said plurality of IO devices and a bus for connecting said IO controller to said CPU and memory, comprising the steps of:

storing in memory a plurality of linked DMA start request quads for each of said IO controllers, each said DMA start request quad corresponding to one of said IO devices and storing in said memory a plurality of linked command data quads for each of said DMA start request quad;

registering in said IO controller a start address identifying a first address in said memory for the corresponding linked DMA start request quads;

a first one of said plurality of DMA start request quads for each of said IO controllers having a first pointer for identifying the first address in said memory for a next linked one of said DMA start request quads of said first plurality, and a second pointer for identifying a second address in said memory for a first linked one of said plurality of command data quads;

executing DMA processing in response to receiving a DMA start request control by first reading a location in said memory identified by said registered start address for said first one of said DMA start request quads, storing the contents of the addressed DMA start request quad in local memory in said IO controller, and executing said DMA processing by reading said memory at said second address identified by said second pointer and executing said DMA command quad data.

6. The method for controlling DMA processing according to claim 5, further including:

storing in main memory a completion list having linked completion data structures, wherein each structure identifies a corresponding one of said IO devices and stores a status of said IO device.

7. The method for controlling DMA processing according to claim 6, further including:

a status message that said IO controller has completed the DMA processing for said IO device.

8. The method for controlling DMA processing according to claim 5, wherein said IO controller, during the processing of a first DMA start request, initiates at least one additional DMA processing.

9. A system for controlling DMA processing for a plurality of IO devices connected to a data processing system having memory, a CPU, at least one IO controller and a bus for connecting said at least one IO controller to said CPU and memory, comprising:

means for storing in the memory a plurality of DMA request quads for each of said IO devices into a DMA request data structure, and storing IO command data into a plurality of DMA command data structures in said memory, said DMA request data structure having a plurality of DMA start request quads linked together including a first one having a location identified by a first address in said memory, wherein said DMA command data structures respectively correspond to said IO devices and to said DMA request quads said at least one IO controller having means for receiving a start control; and said IO controller executing DMA processing in response to receiving said start control including reading from the memory said first DMA start request quad for one IO device of said plurality of IO devices and executing the DMA processing with said one IO device on the basis of said DMA start request quad data.

10. A system for controlling a plurality of IO devices according to claim 9, wherein said means for receiving start control in said IO controller receives the start control from said CPU.

11. A system for controlling DMA processing according to claim 9, wherein said means for storing further stores IO command data for each of said plurality of IO devices in linked command quads having a first command quad stored at a second address identified by a corresponding one of said DMA start request quads, and each said command quad having a pointer for identifying an address in said memory for the next said command quad.

12. The system for controlling DMA processing according to claim 9, wherein a last one of said command quads has data identifying completion of said DMA processing for said one IO device; and said means for storing stores a completion list having IO device status data updated by said completion data.

13. The system for controlling DMA processing according to claim 9, wherein said means for storing stores a plurality of said DMA start request quads linked together and having first and second pointers such that after said IO controller address register accesses said memory at said first address for said first DMA start request quad the next DMA start request quad address is provided to said IO controller by said first pointer in said first start request quad and further such that said second pointer identifies an address of said first command quad of said corresponding one of said DMA start request quad.

14. The system for controlling DMA processing according to claim 9, wherein said IO controller has a start request analysis section for reading said start control and initiating said executing of the DMA processing when said start control is received.

15. The system for controlling DMA processing according to claim 13, wherein said IO controller has a DMA processing section for reading the DMA command data structure on the basis of said second pointer address and transferring the linked command data to said local memory and thereafter transferring the data stored in said local memory to a corresponding one of said IO devices identified by said IO identifier in said corresponding DMA start request quads.

16. A system for controlling DMA processing for a plurality of IO devices connected to a data processing system having memory, a CPU, a plurality of IO controllers, each controlling one set of said plurality of IO devices and a bus for connecting said IO controller to said CPU and memory, comprising:

means for storing in memory a plurality of linked DMA start request quads for each of said IO controllers, each said DMA start request quad corresponding to one of said IO devices and further for storing in said memory a plurality of linked command data quads for each of said DMA start request quad;

a first one of said plurality of DMA request start quads for each of said IO controllers having a first pointer for identifying a first address in said memory for a next linked one of said DMA start request quads of said first plurality, and a second pointer for identifying a second address in said memory for a first linked one of said plurality of command data quads;

each of said IO controllers having means for executing DMA processing in accordance with said first one of said DMA start request quads, means for storing the contents of the addressed DMA start request quad in local memory in said IO controller, wherein said reading reads said memory at said second address identified by said second pointer after said executing means commences processing of said DMA processing on the basis of said first DMA start request quad.

17. The system for controlling DMA processing according to claim 16, further including:

means storing a completion list having linked completion data structures, wherein each structure identifies a corresponding one of said IO devices and stores a status of said IO device with respect to termination of a DMA processing.

18. The system for controlling DMA processing according to claim 16, wherein said IO controller, during the processing of a first DMA start request, initiates at least one additional DMA processing.

19. The system for controlling DMA processing according to claim 16, wherein said IO controllers include at least one main IO controller and a plurality of sub controllers connected to the main IO controller, and further wherein said sub controllers each have one or more of said IO devices connected thereto.

20. The system for controlling DMA processing according to claim 16, wherein each said IO controller has a start address identifying a first address in said memory for the corresponding linked DMA start request quads; and wherein said means for executing DMA processing executes DMA processing in response to receiving a DMA start request control and has means for reading a location in said memory identified by said start address.

21. A data processing system comprising:

a CPU;

a plurality of IO devices;

at least one IO controller, to which said plurality of IO devices are connected, said at least one IO controller controlling said IO devices and having an address register for storing a start address;

a memory for storing DMA request data structure being stored at said start address and including a plurality of DMA request data quads, and for storing a plurality of DMA command data structure each corresponding to one of said DMA request data quads and each having a command quad for controlling DMA processing; and a bus for connecting said IO controller to said CPU and said memory;

wherein said IO controller selects one of said DMA request data quads in response to receiving a start control, and executes DMA processing in accordance with said command quad of a DMA command data structure corresponding to the selected DMA request data quads.

22. A data processing system according to claim 21, wherein each of said DMA request data quads has a pointer for specifying a DMA command data structure corresponding thereto.

23. A data processing system according to claim 21, wherein each of said DMA request data quads has an IO device identifier for identifying an IO device of said plurality of IO devices and wherein said IO controller selects said one DMA request data quad based on said IO device identifier.

* * * * *